US012615486B2

(12) United States Patent
Wu et al.

(10) Patent No.: US 12,615,486 B2
(45) Date of Patent: Apr. 28, 2026

(54) IN-EAR HEADPHONE TESTING SYSTEM AND METHOD

(71) Applicant: MERRY ELECTRONICS (SUZHOU) CO., LTD., Suzhou City (CN)

(72) Inventors: Hui Wu, Suzhou City (CN); Chunyan Hu, Suzhou City (CN); Guoyu Fan, Suzhou City (CN)

(73) Assignee: MERRY ELECTRONICS (SUZHOU) CO., LTD., Suzhou City (CN)

( * ) Notice: Subject to any disclaimer, the term of this patent is extended or adjusted under 35 U.S.C. 154(b) by 273 days.

(21) Appl. No.: 18/514,688

(22) Filed: Nov. 20, 2023

(65) Prior Publication Data

US 2025/0071494 A1 Feb. 27, 2025

(30) Foreign Application Priority Data

Aug. 24, 2023 (CN) ......................... 202311075353.3

(51) Int. Cl.
*H04R 29/00* (2006.01)
*H04R 1/10* (2026.01)

(52) U.S. Cl.
CPC ......... *H04R 29/001* (2013.01); *H04R 1/1016* (2013.01); *H04R 1/1091* (2013.01)

(58) Field of Classification Search
CPC .. H04R 29/001; H04R 1/1016; H04R 1/1091; H04R 29/008; H04R 29/00; H04R 3/00; H04R 2420/05
See application file for complete search history.

(56) References Cited

U.S. PATENT DOCUMENTS

| | | | | |
|---|---|---|---|---|
| 9,554,226 B2 * | 1/2017 | Horbach | ................ | H04R 29/00 |
| 9,877,125 B2 * | 1/2018 | Ikeda | .................. | H04R 29/001 |
| 10,264,378 B2 * | 4/2019 | Ikeda | .................. | H04R 29/001 |
| 10,984,779 B2 * | 4/2021 | Cho | ................. | G10K 11/17881 |
| 11,600,256 B2 * | 3/2023 | Rule | .................... | H04R 1/1083 |
| 2002/0080988 A1 * | 6/2002 | Raviv | .................. | H04R 25/652<br>381/372 |
| 2004/0037428 A1 * | 2/2004 | Keller | .................... | A61B 5/121<br>381/60 |

(Continued)

FOREIGN PATENT DOCUMENTS

| | | | |
|---|---|---|---|
| CN | 202799151 U | * | 3/2013 |
| CN | 115790831 A | | 3/2023 |
| JP | 2012015833 A | * | 1/2012 |

*Primary Examiner* — Oyesola C Ojo
(74) *Attorney, Agent, or Firm* — Birch, Stewart, Kolasch & Birch, LLP

(57) ABSTRACT

Provided are an in-ear headphone testing system and method. The system includes a to-be-tested in-ear headphone, a terminal device, and a testing device, the terminal device is configured to control the to-be-tested in-ear headphone to output a preset sound, and the testing device includes a base, a sound collection module, a coupling cavity, and a control chip. The control chip is built into the base, the base is connected to the coupling cavity, the sound collection module is placed between the base and the coupling cavity, and the coupling cavity is used for placing the tested in-ear headphone. The sound collection module is configured to collect a sound signal outputted by the tested in-ear headphone. The control chip is configured to process the sound signal to obtain a test result.

7 Claims, 3 Drawing Sheets

(56) References Cited

U.S. PATENT DOCUMENTS

| | | | | |
|---|---|---|---|---|
| 2006/0188105 | A1* | 8/2006 | Baskerville | A61F 11/08 381/328 |
| 2010/0092001 | A1* | 4/2010 | Saltykov | H04R 25/70 381/60 |
| 2013/0236023 | A1* | 9/2013 | Horbach | H04R 29/00 381/59 |
| 2014/0146973 | A1* | 5/2014 | Liu | H04R 29/001 381/58 |
| 2019/0037324 | A1* | 1/2019 | Darlington | H04R 29/00 |
| 2024/0148557 | A1* | 5/2024 | Frost | G01H 3/14 |

* cited by examiner

IN-EAR HEADPHONE TESTING SYSTEM AND METHOD

CROSS-REFERENCE TO RELATED APPLICATION(S)

This application claims priority to Chinese Patent Application No. 202311075353.3 filed Aug. 24, 2023, the disclosure of which is incorporated herein by reference in its entirety.

TECHNICAL FIELD

Embodiments of the present disclosure relate to the technical field of headphone testing and, in particular, to an in-ear headphone testing system and method.

BACKGROUND

With the rapid development of the headphone industry, various headphones have emerged on the market, the pros and cons of these headphones are uneven, and it is difficult for consumers to distinguish the sound quality among them. The method for evaluating the acoustic performance of a headphone mainly includes objective indicators and subjective evaluation. The objective indicators generally require professional audio devices for testing, but generally, the devices are relatively expensive, and a large number of devices are required to build an electroacoustic testing system. Testing software, a sound card, an artificial ear, a measurement amplifier, and a power amplifier are at least required. Therefore, this method is not suitable for ordinary consumers. Therefore, how an ordinary consumer determines the quality and cost-effectiveness of a headphone is very meaningful.

SUMMARY

Embodiments of the present disclosure provide an in-ear headphone testing system and method. Through the in-ear headphone testing system, no additional external device is needed for the test of relevant acoustic parameters of the in-ear headphone and the acquisition of the test result.

An embodiment of the present disclosure provides an in-ear headphone testing system. The system includes a to-be-tested in-ear headphone, a terminal device, and a testing device. The terminal device is configured to control the to-be-tested in-ear headphone to output a preset sound, the testing device includes a base, a sound collection module, a coupling cavity, and a control chip, the control chip is built into the base, the base is connected to the coupling cavity, the sound collection module is placed between the base and the coupling cavity, and the coupling cavity is used for placing the in-ear headphone.

The sound collection module is configured to collect a sound signal outputted by the in-ear headphone.

The control chip is configured to process the sound signal to obtain a test result.

An embodiment of the present disclosure provides an in-ear headphone testing method. The method includes the steps described below.

A sound signal outputted by an in-ear headphone is acquired.

The sound signal is processed to obtain a test result.

The present disclosure provides an in-ear headphone testing system and method. The system includes a to-be-tested in-ear headphone, a terminal device, and a testing device, the terminal device is configured to control the to-be-tested in-ear headphone to output a preset sound, and the testing device includes a base, a sound collection module, a coupling cavity, and a control chip. The control chip is built into the base, the base is connected to the coupling cavity, the sound collection module is placed between the base and the coupling cavity, and the coupling cavity is used for placing the tested in-ear headphone. The sound collection module is configured to collect a sound signal outputted by the tested in-ear headphone. The control chip is configured to process the sound signal to obtain a test result. Through the preceding technical scheme, no additional external device is required, and relevant acoustic parameters of the in-ear headphone can be tested only by the testing system so as to acquire the test result.

BRIEF DESCRIPTION OF DRAWINGS

The above and other features, advantages, and aspects of embodiments of the present disclosure will become more apparent with reference to the specific implementations hereinafter in conjunction with drawings. The same or similar reference numerals in the drawings denote the same or similar elements. It is to be understood that the drawings are schematic, and that originals and elements are not necessarily drawn to scale.

DETAILED DESCRIPTION

Figure 1:
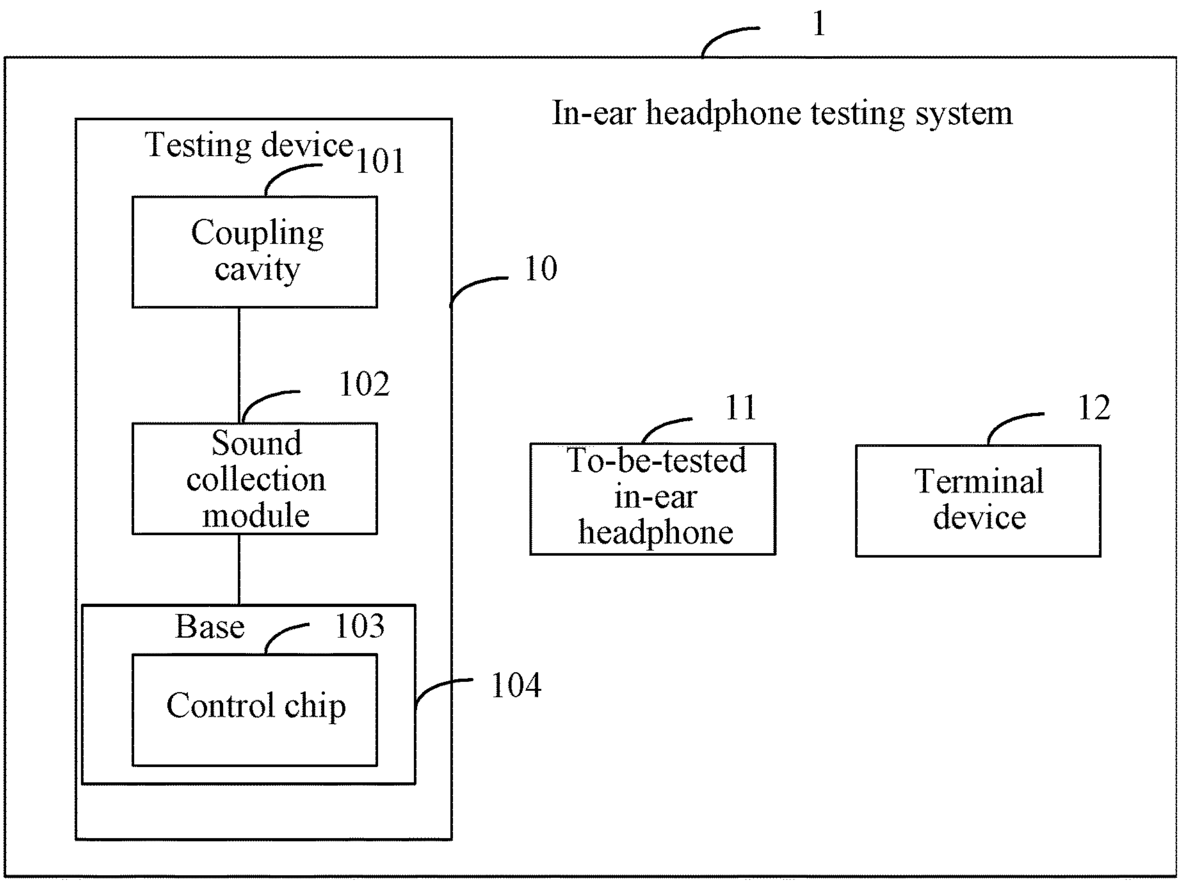
FIG. 1 is a structural diagram of an in-ear headphone testing system according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that the drawings and embodiments of the present disclosure are merely illustrative and are not intended to limit the scope of the present disclosure.

It is to be understood that the various steps recorded in the method embodiments of the present disclosure may be performed in a different order, and/or in parallel. In addition, the method embodiments may include additional steps and/or omit some of the illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" mentioned in the present disclosure are intended to be illustrative and not limiting; those skilled in the art should understand that "one" or "a plurality" should be understood as "one or more" unless clearly expressed in the context.

The names of messages or information exchanged between apparatuses in embodiments of the present disclosure are illustrative and not to limit the scope of the messages or information.

It is to be understood that before using technical schemes disclosed in various embodiments of the present disclosure, a user should be notified of the type, scope of use, use scene, and the like of personal information involved in the present disclosure and authorization from the user should be acquired in an appropriate manner according to relevant laws and regulations.

For example, in response to receiving an active request from a user, prompt information is sent to the user to explicitly remind the user that the requested operation requires acquisition and use of personal information of the user. Accordingly, the user can autonomously choose, according to the prompt information, whether to provide personal information for software or hardware, such as an electronic device, an application program, a server, or a storage medium, for executing the operations of the technical schemes of the present disclosure.

In an alternative but non-limiting implementation, in response to receiving the active request from the user, the manner in which the prompt information is sent to the user may be, for example, in the form of a pop-up window in which the prompt information may be presented in the text. Additionally, the pop-up window may also carry a selection control for the user to select "agree" or "disagree" to provide personal information for the electronic device.

It is to be understood that the preceding process of notifying the user and getting the authorization from the user is illustrative and does not limit the embodiments of the present disclosure and that other manners complying with relevant laws and regulations may also be applied to the embodiments of the present disclosure.

It is to be understood that data (including, but not limited to, the data itself and acquisition or use of the data) involved in the schemes should comply with corresponding laws and regulations and relevant provisions.

Embodiment One

FIG. 1 is a structural diagram of an in-ear headphone testing system according to an embodiment of the present disclosure. The in-ear headphone testing system 1 includes a to-be-tested in-ear headphone 11, a terminal device 12, and a testing device 10, the terminal device 12 is configured to control the to-be-tested in-ear headphone 11 to output a preset sound, the testing device 10 includes a base 104, a sound collection module 102, a coupling cavity 101, and a control chip 103, the control chip 103 is built into the base 104, the base 104 is connected to the coupling cavity 101, and the sound collection module 102 is placed between the base 104 and the coupling cavity 101. The coupling cavity 101 is used for placing the tested in-ear headphone. The terminal device 12 sends a set frequency sweep signal to the in-ear headphone, and the in-ear headphone outputs the preset sound according to the frequency sweep signal.

The to-be-tested in-ear headphone 11 may be a wired earphone, a Bluetooth earphone, or other in-ear headphones. The terminal device 12 may be a mobile phone, a tablet computer, or another terminal device 12. Application (APP) testing software may be configured in the terminal device 12. At the same time, during the test, the to-be-tested in-ear headphone 11 is connected to the terminal device 12, and the testing device 10 is connected to the terminal device 12 through wireless fidelity (Wi-Fi). The terminal device 12 controls the to-be-tested in-ear headphone 11 to output different preset sounds by sending different frequency sweep signals.

Figure 2:
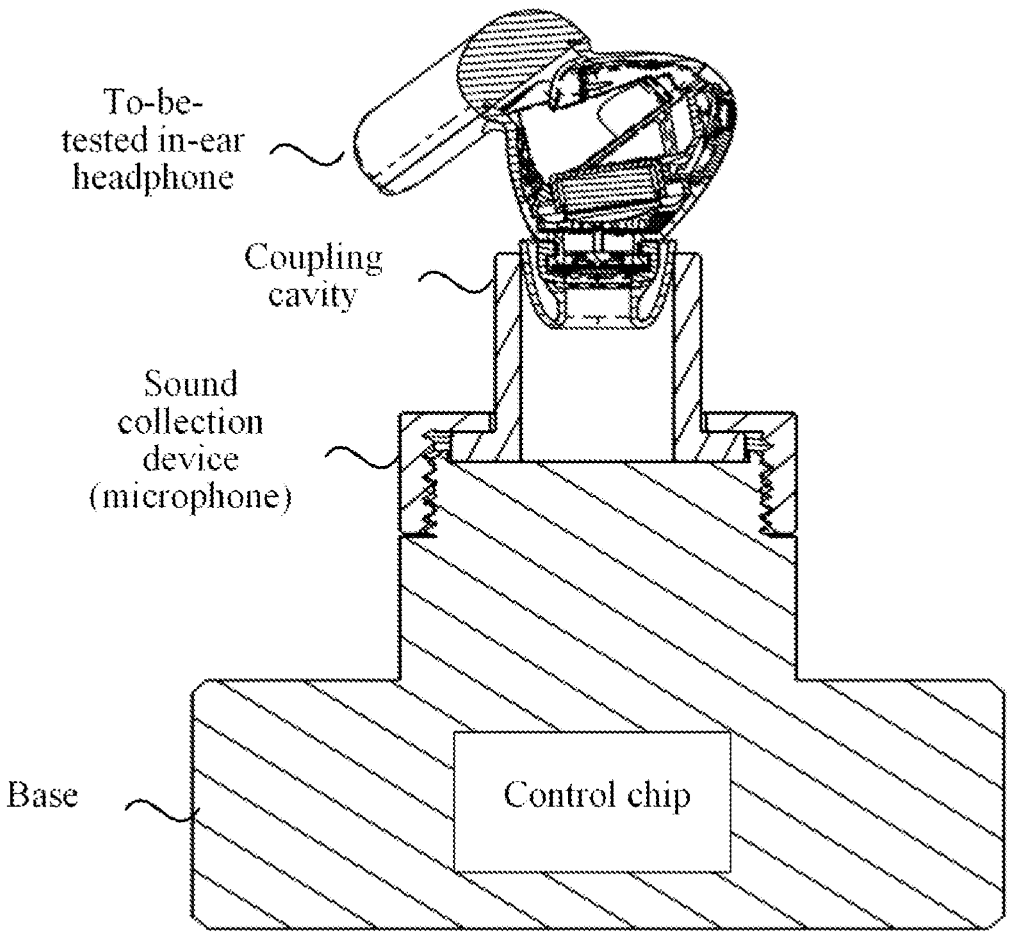
FIG. 2 is a structural view of a testing device in an in-ear headphone testing system according to an embodiment of the present disclosure.

FIG. 2 is a structural view of a testing device 10 in an in-ear headphone testing system according to an embodiment of the present disclosure. As shown in FIG. 2, the to-be-tested in-ear headphone 11 is placed in the coupling cavity 101 of the testing device 10, the lower part of the testing device 10 is the base 104, the base 104 is connected to the coupling cavity 101, and the sound collection module 102 is placed between the base 104 and the coupling cavity 101. The control chip 103 is built in the base 104. The sound collection module 102 may be a microphone. The coupling cavity 101 may be replaced according to the dimension and shape of the in-ear headphone.

The sound collection module 102 is configured to collect a sound signal outputted by the tested in-ear headphone. The control chip 103 is configured to process the sound signal to obtain a test result. The test result includes sound sensitivity information and distortion information.

In an embodiment, the sound collection module 102 is configured to collect the sound signal outputted by the tested in-ear headphone. Then, the control chip 103 saves the sound signal collected by the sound collection module 102 to obtain audio data and processes the audio data to obtain a final test result. The finally obtained test result includes the sound sensitivity information and the distortion information. The above-obtained audio data and test result may be stored in the control chip 103. At the same time, the control chip 103 may perform data transmission through Wi-Fi and send the test result to the terminal device 12 for displaying the test result in a user interface.

The control chip 103 includes a data acquisition module 1031 configured to store the sound signal collected by the sound collection module 102 to obtain the audio data and a data processing module 1032 configured to process the audio data to obtain the test result. The data processing module 1032 is further configured to transform the audio data from the time domain to the frequency domain to obtain original frequency response information, intercept frequency response information of a set bandwidth from the original frequency response information to obtain intermediate frequency response information, smooth the intermediate frequency response information to obtain target frequency response information, and determine the test result according to the target frequency response information.

In this embodiment, the frequency response information may represent the correspondence between the sound frequency and the sound intensity. The set bandwidth may be from 20 Hz to 20 kHz, where the set bandwidth is the bandwidth of a standard music mode, which is not limited in this embodiment and may be set according to actual situations.

Figure 3:
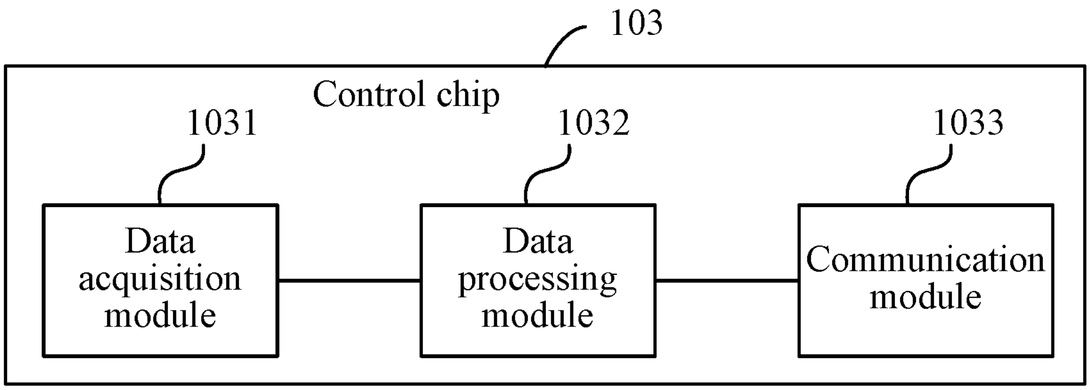
FIG. 3 is a structural diagram of a control chip in an in-ear headphone testing system according to an embodiment of the present disclosure.

FIG. 3 is a structural diagram of a control chip 103 in an in-ear headphone testing system according to an embodiment of the present disclosure. As shown in FIG. 3, the control chip 103 includes the data acquisition module 1031, the data processing module 1032, and a communication module 1033. The data acquisition module 1031 may be configured to save the sound signal collected by the sound collection module to obtain the audio data, that is, a recording file. Then the data processing module 1032 is further configured to transform the audio data from the time domain to the frequency domain, that is, perform the Fourier transform on the audio data to obtain the original frequency response information. After that, the frequency response information of the set bandwidth is intercepted from the original frequency response information so as to obtain the intermediate frequency response information. The intermediate frequency response information is smoothed to obtain the target frequency response information. Finally, the target frequency response information is analyzed to obtain the test result. The test result includes the sound sensitivity information and the distortion information. The smoothing process is to smooth the peaks in the intermediate frequency response information and remove part of information interfered by noise in the intermediate frequency response information.

Based on the preceding description, the sound intensity corresponding to a set frequency in the target frequency response information is determined as the sound sensitivity information. A sound intensity sequence corresponding to a set frequency interval in the target frequency response information is extracted and the distortion information is determined based on the sound intensity sequence. The set frequency may be 1 kHz. The set frequency interval may be from 20 Hz to 10 KHz.

The control chip 103 further includes the communication module 1033. The communication module 1033 is configured to establish a communication connection between the testing device 10 and the terminal device 12 and send the test result to the terminal device 12 for presentation.

In an embodiment, the communication module 1033 may be a Wi-Fi module. The communication connection between the testing device 10 and the terminal device 12 may be established through the communication module 1033 for performing data transmission and sending the final test result to the terminal device 12 for presentation. The terminal device 12 may obtain an evaluation result according to the test result. The final test result and the evaluation result are both displayed in the user interface of the terminal device 12.

In the technical scheme of the embodiments of the present disclosure, the system includes the to-be-tested in-ear headphone 11, the terminal device 12, and the testing device 10, where the terminal device 12 is configured to control the to-be-tested in-ear headphone 11 to output the preset sound, and the testing device 10 includes the base 104, the sound collection module 102, the coupling cavity 101, and the control chip 103. The control chip 103 is built into the base 104, the base 104 is connected to the coupling cavity 101, and the sound collection module 102 is placed between the base 104 and the coupling cavity 101. The coupling cavity 101 is used for placing the tested in-ear headphone. The sound collection module 102 is configured to collect the sound signal outputted by the to-be-tested in-ear headphone. The control chip 103 is configured to process the sound to obtain the test result. Through the preceding technical scheme, no additional external device is required, and only the testing system is required for the test of relevant acoustic parameters of the in-ear headphone and the acquisition of the test result.

Embodiment Two

Figure 4:
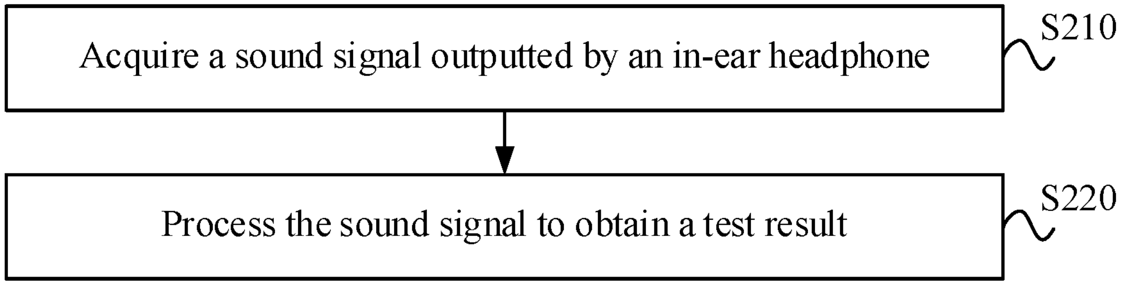
FIG. 4 is a flowchart of an in-ear headphone testing method according to an embodiment of the present disclosure.

FIG. 4 is a flowchart of an in-ear headphone testing method according to an embodiment of the present disclosure. The embodiment of the present disclosure is applicable to the case of providing an in-ear headphone test for the user. This method may be performed by an in-ear headphone testing system which may be implemented in the form of software and/or hardware, in an embodiment, the in-ear headphone testing system may be implemented by an electronic device, such as a mobile terminal, a personal computer (PC) terminal, or a server.

As shown in FIG. 4, the in-ear headphone testing method provided in the embodiment of the present disclosure may include the steps described below.

In S210, a sound signal outputted by an in-ear headphone is acquired.

In an embodiment, the sound signal outputted by the in-ear headphone and collected by the preceding sound collection module is acquired.

In S220, the sound signal is processed so as to obtain a test result.

In an embodiment, the audio data is obtained after the preceding sound signal is saved. The audio signal is transformed from the time domain to the frequency domain so as to obtain original frequency response information, frequency response information of a set bandwidth is intercepted from the original frequency response information to obtain intermediate frequency response information, the intermediate frequency response information is smoothed to obtain target frequency response information, and the test result is determined according to the target frequency response information.

In this embodiment, the set bandwidth may be from 20 Hz to 20 kHz, where the set bandwidth is the bandwidth in the standard music mode, which is not specifically limited in this embodiment and may be set according to actual situations. The original frequency response information may be obtained by performing the Fourier transform on the audio data. The intermediate frequency response information may be frequency response information of the set bandwidth intercepted from the original frequency response information.

In an embodiment, the Fourier transform may be used to transform the audio data from the time domain to the frequency domain, and the complementary filtering or Kalman filtering may be used to smooth the frequency response information.

In an embodiment, the audio data may be obtained after the sound signal is saved, and the audio data is transformed from the time domain to the frequency domain, that is, the Fourier transform is performed to obtain the original frequency response information. After that, the frequency response information of the set bandwidth is intercepted from the original frequency response information to obtain the intermediate frequency response information. The intermediate frequency response information is smoothed to obtain the target frequency response information. Finally, the target frequency response information is analyzed to obtain the test result. The test result includes the sound sensitivity information and the distortion information.

With this method, noise or distortion in the intermediate frequency response information can be reduced by smoothing the frequency response information.

The target frequency response information represents the correspondence between the sound frequency and the sound intensity. In an embodiment, the manner for determining the test result according to the target frequency response information may be as follows: the sound intensity corresponding to a set frequency in the target frequency response information is determined as sound sensitivity information; a sound intensity sequence corresponding to a set frequency interval in the target frequency response information is extracted, and distortion information is determined based on the sound intensity sequence.

The sound intensity corresponding to the set frequency in the target frequency response information is determined as the sound sensitivity information. In the set frequency interval, the sound intensity corresponding to the sound frequency in the target frequency response information is extracted according to a set frequency gap to obtain the sound intensity sequence, harmonic information is extracted from the preceding audio data, and finally, a final distortion sequence, that is, the distortion information, is obtained based on the sound intensity sequence and the harmonic information through a calculation formula for the distortion information. The set frequency may be 1 kHz. The set frequency interval may be 20 Hz to 10 kHz. The set frequency gap may be set according to actual situations and is not limited in this embodiment.

The calculation formula for the distortion information may be as follows:

$$\%\ THD = 100 * \frac{TD}{F}$$

% THD denotes the distortion information, TD denotes the harmonic information, and F denotes the sound intensity sequence.

The present disclosure discloses an in-ear headphone testing method. The method includes acquiring a sound signal outputted by an in-ear headphone and processing the sound signal to obtain a test result. Through this method, the collected audio signal is acquired, the acoustic performance analysis is performed on the audio signal, and the acoustic performance analysis of the in-ear headphone is finally achieved so that an in-ear headphone with better acoustic performance can be quickly and conveniently screened out, thereby assisting consumers in buying a cost-effective headphone.

It is to be understood that various forms of the preceding flows may be used with steps reordered, added, or deleted. For example, the steps described in the present disclosure may be performed in parallel, in sequence, or in a different order as long as the desired result of the technical schemes provided in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement, and the like made within the spirit and principle of the present disclosure fall within the scope of the present disclosure.

What is claimed is:

1. An in-ear headphone testing system, comprising a to-be-tested in-ear headphone, a terminal device, and a testing device, wherein the terminal device is configured to control the to-be-tested in-ear headphone to output a preset sound, and the testing device comprises a base, a sound collection module, a coupling cavity, and a control chip, wherein the control chip is built into the base, the base is connected to the coupling cavity, the sound collection module is placed between the base and the coupling cavity, and the coupling cavity is used for placing the in-ear headphone;

the sound collection module is configured to collect a sound signal outputted by the in-ear headphone; and the control chip is configured to process the sound signal to obtain a test result;

wherein the control chip comprises a data acquisition module configured to save the sound signal collected by the sound collection module to obtain audio data and a data processing module configured to process the audio data to obtain the test result; and wherein the data processing module is further configured to transform the audio data from a time domain to a frequency domain to obtain original frequency response information, intercept frequency response information of a set bandwidth from the original frequency response information to obtain intermediate frequency response information, smooth the intermediate frequency response information to obtain target frequency response information, and determine the test result according to the target frequency response information.

2. The in-ear headphone testing system of claim 1, wherein the terminal device sends a set frequency sweep signal to the in-ear headphone, and the in-ear headphone outputs the preset sound according to the frequency sweep signal.

3. The in-ear headphone testing system of claim 1, wherein the control chip comprises a communication module, wherein the communication module is configured to establish a communication connection between the testing device and the terminal device and send the test result to the terminal device for presentation.

4. The in-ear headphone testing system of claim 3, wherein the test result comprises sound sensitivity information and distortion information.

5. An in-ear headphone testing method, being performed by an in-ear headphone testing system and comprising:

acquiring a sound signal outputted by an in-ear headphone; and processing the sound signal to obtain a test result;

wherein the in-ear headphone testing system comprises a to-be-tested in-ear headphone, a terminal device, and a testing device, the terminal device is configured to control the to-be-tested in-ear headphone to output a preset sound, and the testing device comprises a base, a sound collection module, a coupling cavity, and a control chip, wherein the control chip is built into the base, the base is connected to the coupling cavity, the sound collection module is placed between the base and the coupling cavity, and the coupling cavity is used for placing the in-ear headphone; and wherein processing the sound signal to obtain the test result comprises:

obtaining audio data after the sound signal is saved, transforming the audio data from a time domain to a frequency domain to obtain original frequency response information, intercepting frequency response information of a set bandwidth from the original frequency response information to obtain intermediate frequency response information, smoothing the intermediate frequency response information to obtain target frequency response information, and determining the test result according to the target frequency response information.

6. The in-ear headphone testing method of claim 5, wherein the target frequency response information represents correspondence between a sound frequency and a sound intensity, and determining the test result according to the target frequency response information comprises:

determining a sound intensity corresponding to a set frequency in the target frequency response information as sound sensitivity information; and extracting a sound intensity sequence corresponding to a set frequency interval in the target frequency response information and determining distortion information based on the sound intensity sequence.

7. The in-ear headphone testing method of claim 5, wherein after the test result is obtained, the in-ear headphone testing method further comprises: displaying the test result.

* * * * *